United States Patent [19]

Trenka

[11] Patent Number: 5,074,944
[45] Date of Patent: Dec. 24, 1991

[54] METHOD FOR MANUFACTURING A LAYERED ARTICLE HAVING A BEVELED EDGE

[75] Inventor: Herbert M. Trenka, Clearwater, Fla.

[73] Assignee: Smith & Nephew United, Inc., Largo, Fla.

[21] Appl. No.: 385,548

[22] Filed: Jul. 26, 1989

Related U.S. Application Data

[62] Division of Ser. No. 199,833, May 27, 1988, abandoned.

[51] Int. Cl.⁵ .................................. B32B 31/20
[52] U.S. Cl. ...................... 156/219; 100/237; 156/222; 156/223; 156/267; 156/312; 156/580; 264/252
[58] Field of Search .............. 156/223, 312, 251, 222, 156/580, 267, 261, 219; 100/237, 265, 208; 128/156; 264/252, 296

[56] References Cited

U.S. PATENT DOCUMENTS

| | | | |
|---|---|---|---|
| 3,711,362 | 1/1973 | Ballard | 156/219 |
| 4,043,858 | 8/1977 | Dantowitz | 156/267 X |
| 4,256,024 | 3/1981 | Carlisle | 156/251 X |
| 4,259,467 | 3/1981 | Keogh et al. | 526/279 |
| 4,699,134 | 10/1987 | Samuelsen | 128/156 |
| 4,867,748 | 9/1989 | Samuelsen | 128/156 X |

Primary Examiner—Michael W. Ball
Assistant Examiner—Michele K. Yoder
Attorney, Agent, or Firm—Rosenman & Colin

[57] ABSTRACT

A device and method for manufacturing a layered article having a beveled edge and including a flexible outer layer and an internal elastomeric layer. The device comprises independently operative bearing surfaces wherein a first surface exerts a first pressure on the article body and a second surface exerts a second pressure on the article edge.

10 Claims, 3 Drawing Sheets

METHOD FOR MANUFACTURING A LAYERED ARTICLE HAVING A BEVELED EDGE

This is a continuation of Ser. No. 199,833 filed May 27, 1988 now abandoned.

BACKGROUND OF THE INVENTION

The present invention generally relates to an apparatus and method for manufacturing layered articles and, more particularly, it relates to a device suitable for use in manufacturing a multilayered article having at least one beveled edge. The article would typically comprise one or more flexible outer layers and at least one internal elastomeric layer. Typical layered articles would include wound dressings and ostomy connectors for attachment to human skin.

A first, with reference to FIGS. 1 and 2, a typical example of a conventional wound dressing 1 will herein be described. Specifically, dressing 1 comprises a multi-layered product having a cover layer 3, a thick inner adhesive layer 5 and a release layer 7, characteristically paper. Typically, the release layer is removed and the dressing is applied to the skin of a patient. The dressing is placed over the wound site and the adhesive secures the device to the skin. As can clearly be seen upon review of FIG. 2, edges 9 are not tapered or beveled.

Wound dressing 1, which finds application in protecting a wound from external contamination, presents a number of operational difficulties while in place on the patient. Typically, thick adhesive wound dressings of the kind depicted in FIG. 1 are used on human skin and the edges often curl or become detached from the skin due to mechanical contact and engagement with clothing, in the case of ambulatory patients, or with bed linen and bed sheets, in the case of bedridden patients. The curling and detachment problems associated with prior art adhesive wound dressings have heretofore been solved by overtaping the edges of the thick wound dressings or coverings. Overtaping is achieved by means of applying an additional layer of either film or commercially available adhesive tape, or the like, over the top of the adhesive pad to assure edge contact with the skin.

The primary objective of the present invention is to advance the art field by providing a device and method for manufacturing a layered article having a beveled edge, particularly, an adhesive wound dressing or ostomy connector having a beveled edge. The beveled edge wound dressing lessens or eliminates the disadvantages aforementioned with respect to conventional thick adhesive dressings. Additional advantages of the inventive dressing are that it will not stick to its outer packaging, that it provides a more natural blend into the skin surface of a user, and that it presents a lower profile to lessen visibility through clothing. Although wound dressings are specifically addressed, the advantages are equally applicable to ostomy connectors. Accordingly, I have invented a beveled edge wound dressing and a device and method for manufacturing the dressing, which dressing, in use, overcomes many of the operational problems associated with presently available thick adhesive dressings and which provides advantages not known with conventional thick adhesive wound dressings.

SUMMARY OF THE INVENTION

The device of the present invention is particularly suitable for use in manufacturing an article having a plurality of layers and at least one beveled edge. Furthermore, the article includes one or more flexible outer layers and at least one internally disposed layer comprising an elastomeric material. Specifically, the device comprises a platform or work table; a first surface adapted to apply a predetermined pressure to the article being supported on the platform, the first surface being dimensioned and configured to contact a predetermined portion of the article at a location spaced from the edge; means responsive to a force exerted on the device for urging the first surface into contact with the article and generating the predetermined pressure exerted on the article, the pressure being sufficient to substantially restrain the elastomeric material against movement; and a second surface adapted to apply a predetermined pressure to the edge of the article sufficient to form the bevel. The first and the second pressure exerting surfaces are movable relative to one another with the first surface adapted to exert pressure on the article prior to the second surface exerting pressure on the edge. The elastomeric material layer is typically an adhesive having a hardness in the range of from about 20 to about 40 as measured on the Shore A Scale. Preferably, the hardness is in the range of from about 25 to about 32. The pressure exerted by the first surface ranges from about 110 to about 140 pounds per square inch, with a preferred pressure being about 122 pounds per square inch. The pressure exerted by the second surface ranges from about 550 to about 650 pounds per square inch, with a preferred pressure being about 600 pounds per square inch. Typically, the second surface will have a tapered pressure exerting segment, with the taper being a slope in the range of from about 5° to about 20° and preferably about 15°. Alternatively, the second surface pressure exerting segment might assume an arcuate configuration having a radius in the range of from about two inches to about three inches.

The article of manufacture might be a wound dressing or an ostomy connector suitable for attachment to human skin. Also contemplated is a multilayered adhesive wound dressing having a beveled edge. The adhesive wound dressing might include an internally disposed layer of elastomeric material, preferably a thick adhesive having a thickness ranging from about 10 to about 150 mils and having a hardness in the range of from about 25 to about 32 as measured on the Shore A Scale. A preferred adhesive hardness would be about 28.

The present invention also contemplates a method of manufacturing a layered article having at least one beveled edge. The inventive steps comprise supporting on a platform a length of feed stock having a plurality of layers, with one or more outer layers being flexible and with at least one internally disposed layer being an elastomeric material; first contacting the stock with a first surface dimensioned and configured to engage predetermined portion of the stock at a location spaced from the edge; applying a force to the first surface to generate a predetermined pressure on the stock, with the pressure being sufficient to substantially restrain the elastomeric material against movement; and then contacting the stock with a second surface at the edge location of the article and exerting a predetermined pressure on the edge sufficient to form the bevel.

The various features of novelty which characterize the invention are pointed out with particularity in the claims annexed to and forming a part of this disclosure.

For a better understanding of the invention, its operating advantages and specific results obtained by its use, reference should be made to the corresponding drawings and descriptive matter in which there are illustrated and described typical embodiments of the invention.

DETAILED DESCRIPTION OF THE PREFERRED EMBODIMENTS

Figure 1:
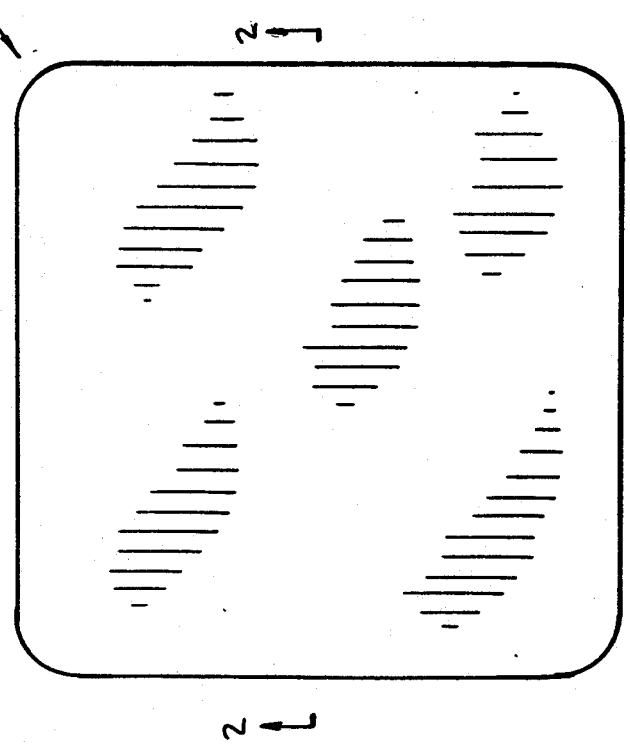
FIG. 1 is a plan view of a typical prior art multilayered thick adhesive wound dressing.
Figure 2:
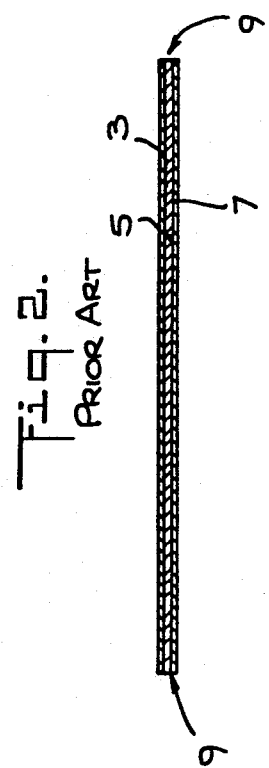
FIG. 2 is a cross-sectional view taken along line 2—2 of the dressing depicted in FIG. 1.
Figure 3:
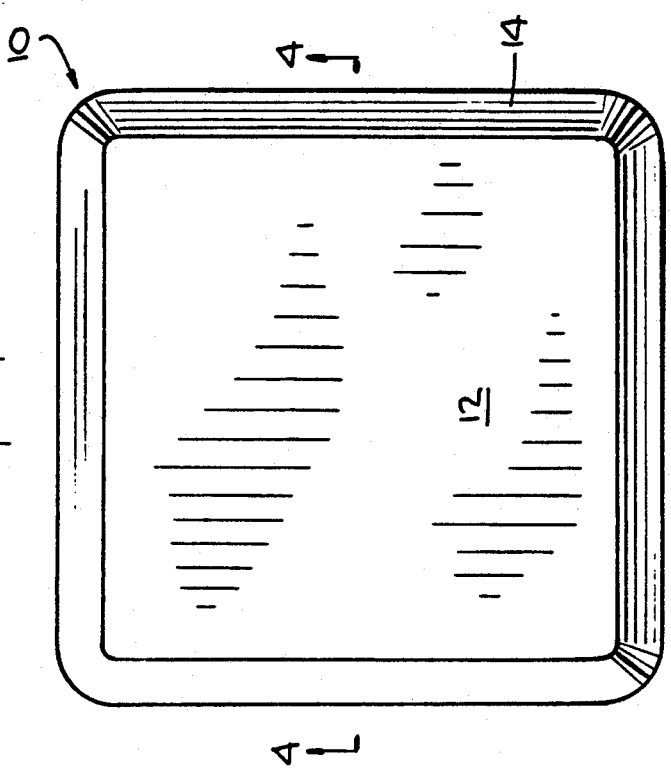
FIG. 3 is a plan view of a multilayered wound dressing, in accordance with the principles of the present invention, having beveled edges displayed around the perimeter of the dressing.
Figure 4:
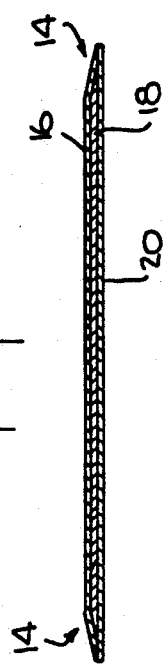
FIG. 4 is a cross-sectional view taken along line 4—4 of the dressing illustrated in FIG. 3.

The description herein presented refers to the accompanying drawings in which the reference numerals used refer to like parts throughout the several views. First turning to FIGS. 3 and 4, there are illustrated plan and cross-sectional views of a multilayered wound dressing 10 having body portion 12 spaced from beveled edge 14 and further including cover layer 16 adhesive layer 18 and release layer 20. Cover layer 16 is a flexible composition. Suitable cover layer materials include but are not limited to, for example, woven or knitted fabric such as cotton or polyester, non-woven polymeric or natural fiber, semi-reticulated or fully reticulated foam sheet, moisture vapor permeable film such as polyurethane or copolyester, and perforated plastic film. Adhesive layer 18 is a thick layer adhesive which ranges in thickness at a lower end of from about 10 mils to a higher end of from about 100 to about 150 mils. A suitable adhesive matrix composition would include polyisobutylene, polyvinylpyrollidone, modified starch, pectin, acrylic elastomer and fiber. Adhesive hardness might range from about 20 to about 40 as measured on the Shore A Scale. A preferred hardness range might be from about 25 to about 32 and a most preferred hardness might be about 28. Hardness may be measured as determined by ASTM Designation: D2240, "Rubber Property-Durometer Hardness", which embodies an authoritative recommended test procedure. Durometers are commercially available from the Shore Instrument and Manufacturing Company, Inc. of Freeport, N.Y. Release layer 20 may be any sheet material such as paper, polyethylene, polypropylene, or the like, which will adequately protect and be readily released from adhesive layer 18. In use, release layer 20 is removed from adhesive layer 18, exposing the adhesive, and dressing 10 is then placed over a wound site and secured thereto through adhesive contact with a patient's skin surrounding the wound. Also contemplated, but not shown, is an article, similar to wound dressing 10, but used as an ostomy connector for adhesively connecting an ostomy appliance to a patient's skin. Typically, the connector would have a generally centrally located port communicating with a body opening and the exposed adhesive surrounding the port would secure the connector to the skin surrounding the body opening. A waste collection device would then be placed in communication with the port and secured in position. The edges of the connector would be beveled for reasons heretofore specified in respect to a wound dressing.

Figure 5:
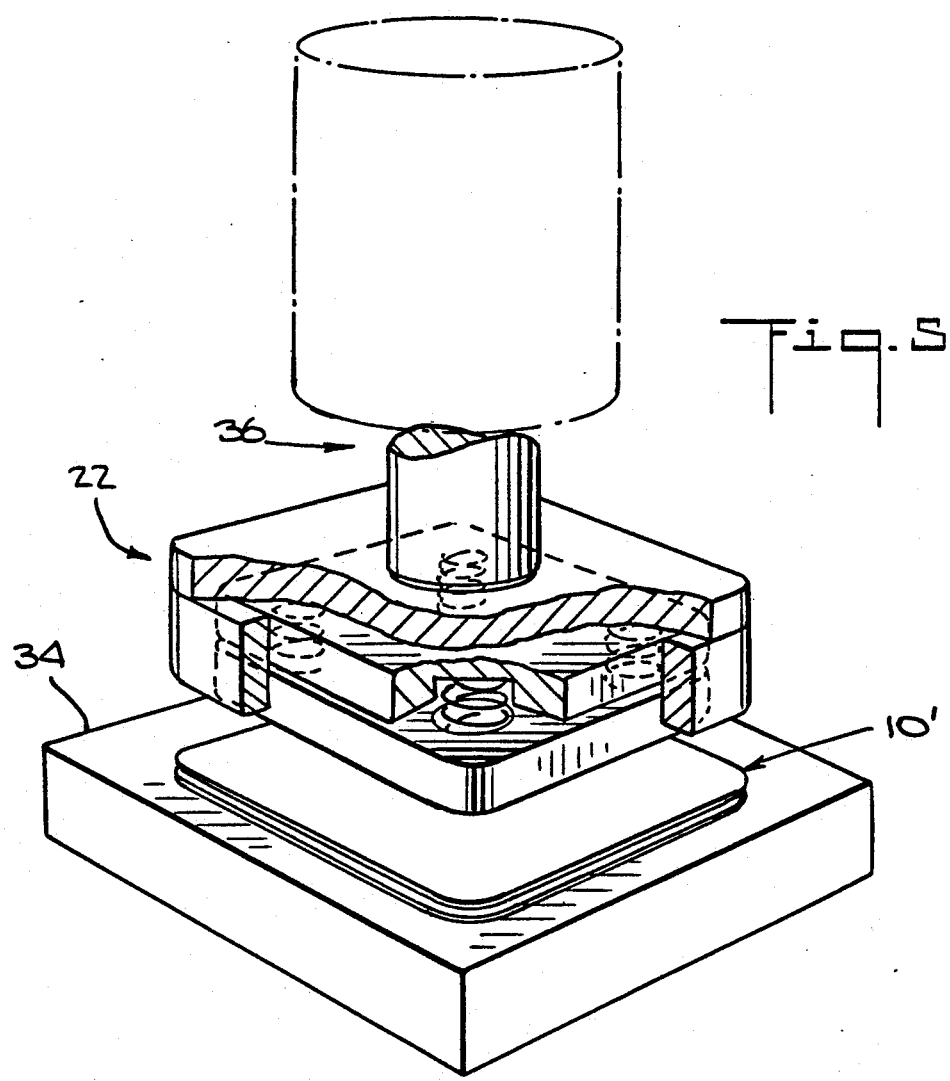
FIG. 5 is a fragmented schematic representation of a device, in accordance with the principles of the present invention, particularly suitable for use in the manufacture of the wound dressing shown in FIG. 3 but prior to device deployment.

Turning now to FIG. 5, there is illustrated a fragmented schematic representation of device 22 used to manufacture wound dressing 10. Device 22 is shown herein ready for deployment but prior to activation. In this view, unfinished dressing or stock 10' is shown to be presized and awaiting formation of a beveled edge. However, the feed stock could be a continuous feed of multilayered material wherein the edge is formed and then the stock is cut to the desired size. Cutting may be performed at the edge forming station or at a subsequent work station. A finished dressing 10, like that depicted in FIG. 3, would result upon deployment of device 22 to form beveled edge 14 followed by cutting, if necessary, to achieve the finished product.

Figure 6:
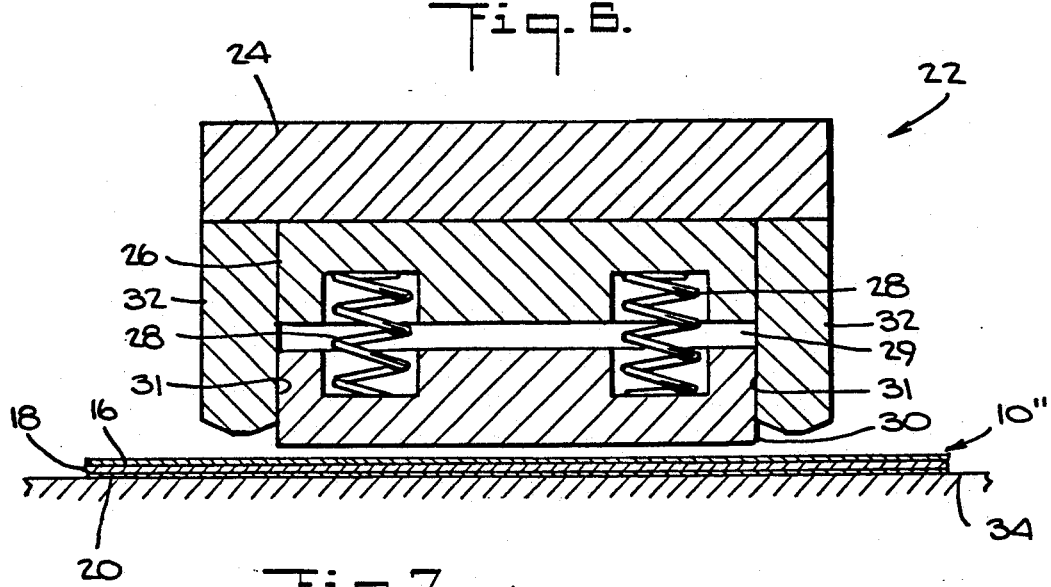
FIGS. 6–8 are schematic sectional representations of the device of FIG. 5 showing the device in a number of operating sequences from rest (FIG. 6) to full deployment (FIG. 8).
Figure 7:
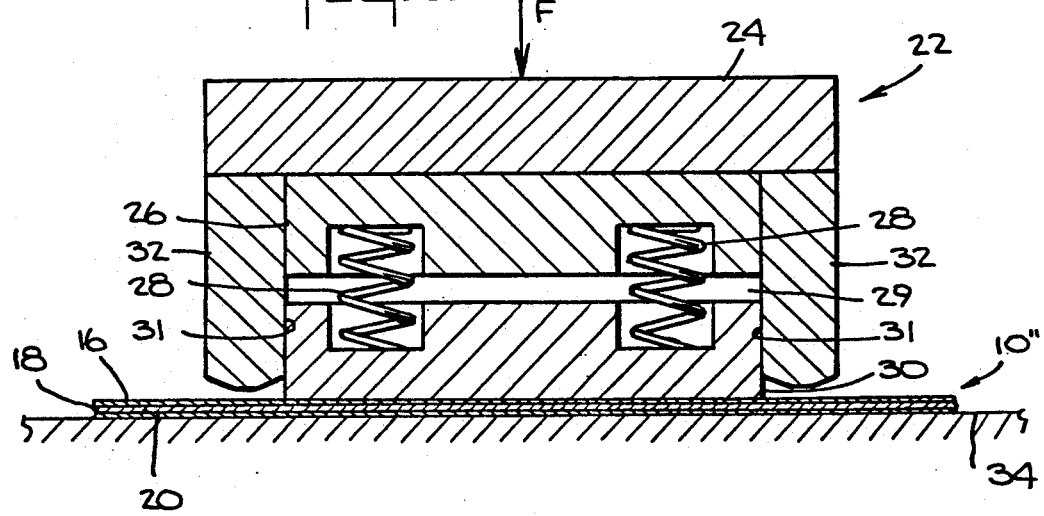
Figure 8:
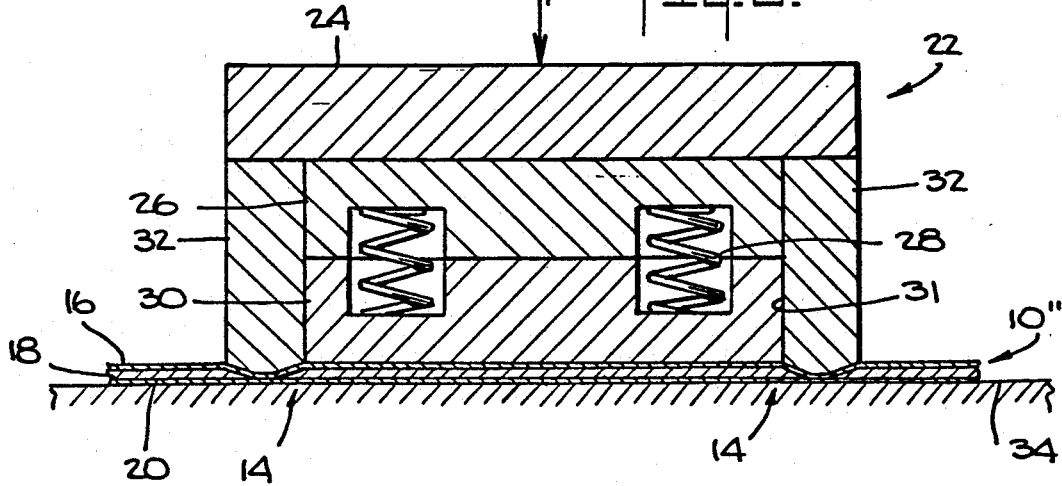
Figure 9:
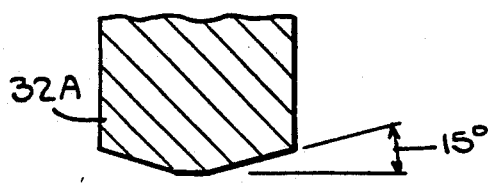
FIG. 9–12 depict a number of edge bearing surfaces having a variety of configurations.
Figure 11:
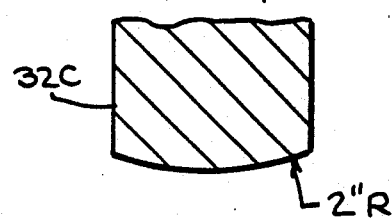
Figure 10:
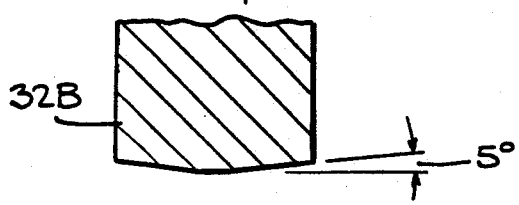
Figure 12:
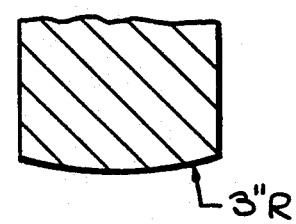

Next turning to FIGS. 6–8 there are shown, sequentially, schematic sectional representations of device 22 from a first inoperative mode (FIG. 6) to a first pressure exerting mode (FIG. 7) to a second pressure exerting mode (FIG. 8). Depicted in FIG. 6 is device 22, which might also be identified as a die set, shown in an open position. The device comprises support plate 24 pressure plate 26 springs 28 platen 30 and taper edge die 32. Unfinished dressing or stock 10" is shown as a continuous feed stock supported on platform 34. The platform has a non-yielding face in contact with the dressing. Support plate 24 is coupled to pressure plate 26 and taper edge die 32 is coupled to plate 24. Alternatively, edge die 32 could be coupled to pressure plate 26. Edge die 32 might assume a number of end configurations as illustrated in FIGS. 9–12. Furthermore, edge die 32 may be releasably coupled to plate 24 or pressure plate 26 to facilitate the selective attachment of dies of different end configurations (FIGS. 9–12). Springs 28 are positioned between pressure plate 26 and platen 30. The springs may be coupled to platen 30 to provide support therefor or, alternatively, the springs might be removably positioned in pockets, as shown, and a fastening means such as a screw type fastener or countersunk bolt (not shown) might couple pressure plate 26 and platen 30. When a bolt or like means is used, the bolt threadingly engages platen 30 for support thereof and pressure plate 26 will be allowed to move along the bolt shaft as springs 28 are compressed, with plate 26 and platen 30 being allowed to move with respect to one another through a distance of gap 29. The gap between plate 26 and platen 30 is equal to or greater than the distance between the bottom of edge die 32 and the top face of platform 34. Said somewhat differently, the gap between plate 26 and platen 30 must always be at least equal to the thickness of stock 10' or 10". Edge die 32 and platen 30 are movable relative to one another. In the embodiment depicted, edge die 32 and platen 30 are slidably engaged along surface 31.

FIG. 7 depicts the imposition of a force F which drives platen 30 into contact with stock 10". Typically, a pneumatic or hydraulic cylinder 36 (FIG. 5), or the like; selectively sized, will be used to generate force F. Upon application of force F, platen 30 exerts pressure on stock 10" (or 10') over an area inside of the edge to be beveled. Platen 30 exerts pressure on stock 10" before taper edge die 32 exerts pressure on stock 10" at the edge location. The pressure applied at the edge location is sufficiently higher than that applied by the platen. FIG. 8 shows edge die 32 in a position wherein beveled edge 14 has been formed. In this FIG. 8, platen 30 builds and holds pressure on stock 10" (or 10') as beveled edge 14 is being formed. The force exerted by the platen is sufficient to substantially restrain adhesive layer 18 against movement where the platen engages body portion 12 located centrally or inwardly from edge 14. The spring loaded platen is designed to keep the adhesive of adhesive layer 18 from being displaced inwardly during formation of the beveled edge. Inward flow of adhesive could result in the undesirable formation of a bulge near the outer edges of the dressing. The pressure exerted by the platen is such that the displaced adhesive is forced to flow outwardly during tapering or edge forming which reduces the tendency of the adhesive to "bleed" from the dressing after manufacture. This is an additional advantage over non beveled edge dressings. After edge formation, the stock is cut to finished product size.

Lastly, turning to FIGS. 9-12 there are therein depicted fragmentary views of a variety of configurations for taper edge die 32. Specifically shown are the lower end or edge bearing surfaces of dies 32A through 32D. The sloping surfaces depicted in FIGS. 9 and 10 of 15° and 5°, respectively, would slope downwardly and away from platen 30 when edge die 32A or 32B are positioned on device 22. Surface slopes could range from about 5° to about 20° with a preferred slope for wound dressing and ostomy connectors being about 15°. Likewise, curved surfaces such as those depicted in FIGS. 11 and 12 of two and three inch radius, respectively, might assume different curvatures but a radius range of from about two inches to a radius of about three inches is preferred to effect a beveled edge on a wound dressing or ostomy connector.

The following discussion will present an example of the operation of device 22 used to form a beveled edge around the perimeter of an adhesive wound dressing. The example is merely illustrative and is not to be construed as limiting the present invention, the scope of which is defined by the claims. The discussion will pertain to a four inch dressing which typically will be a square having a finished dimension of 4.125 inches on a side and having a 0.25 inch wide beveled edge displayed about the perimeter. The force F applied to support plate 24 via pneumatic or hydraulic cylinder 36 will be about 2800 pounds. Four springs 28, rated at about 400 pounds per spring, will be located between pressure plate 26 and platen 30 and will be symetrically disposed about device 22 as shown in FIG. 5. Springs of different ratings are readily available commercially and the springs chosen for use would be selected based upon the pressure desired for delivery to the dressing stock by the pressurizing platen. Platen 30 will exert a pressure over an area of 13.14 square inches [(4.125 in - (2) (0.25 in))$^2$] and create a pressure of about 122 pounds per square inch (1600 pound total spring force ÷13.14 square inches) on stock 10' or 10". The pressure exerted about the edge to form the taper or bevel will be about 600 pounds per square inch. The edge pressure can be calculated by determining the edge area of 3.875 square inches [(4.125 in)$^2$−(4.125−(2)(0.25))$^2$] and divide the area into the applied force F (2800 pounds ÷3.875 in$^2$=722 #/in$^2$) minus the 122#/in$^2$ pressure exerted by platen 30 to arrive at a pressure of about 600#/in$^2$ exerted by taper edge die 32 on stock 10' or 10" to form bevel edge 14 of wound dressing 10. It should be understood that finished dressing and platen sizes, springs, and applied force could be varied and that different pressure could be exerted by the platen and edge die, as desired, to achieve the finished product.

While in accordance with provisions of the statutes there are described herein specific embodiments of the invention, those skilled in the art will understand that changes may be made in the form of the invention covered by the claims appended hereto without departing from the scope and spirit thereof, and that certain features of the invention may sometimes be used to an advantage without corresponding use of the other features.

I claim:

1. A method of manufacturing an article comprising a plurality of layers including an adhesive layer having at least one beveled edge comprising the steps of
   supporting on a platform a length of feed stock having a plurality of layers, with one or more outer layers being flexible and with at least one internally disposed layer being an elastomeric adhesive material; first contacting said stock with a first surface dimensioned and configured to engage a portion of said stock at a location spaced from said edge said location being sufficiently removed from said edge to allow said edge to be beveled;
   applying a force to said first surface to generate a pressure on said stock, with said pressure being sufficient to substantially restrain said elastomeric material against movement; and then contacting said stock with a second surface at said edge location of said article and exerting a pressure on said edge sufficient to form said bevel and wherein said first and second surfaces are movable relative to one another.

2. The method according to claim 1 wherein said elastomeric material layer comprises an adhesive having a hardness in the range of from about 20 to about 40 as measured on the Shore A Scale.

3. The method according to claim 2 wherein the hardness is preferably in the range of from about 25 to about 32.

4. The method according to claim 2 wherein the thickness of said adhesive ranges from about 10 to about 150 mils.

5. The method according to claim 1 wherein said pressure exerted on said article by said first surface is in the range of from about 110 to about 140 pounds per square inch.

6. The method according to claim 5 wherein said pressure is preferably about 122 pounds per square inch.

7. The method according to claim 1 wherein said pressure exerted on said edge of said article by said second surface is in the range of from about 550 to about 650 pounds per square inch.

8. The method according to claim 7 wherein said pressure is preferably about 600 pounds per square inch.

9. A method of manufacturing an article comprising a plurality of layers including an adhesive layer having at least one beveled edge comprising the steps of
   supporting on a platform a length of feed stock having a plurality of layers, with one or more outer layers being flexible and with at least one internally disposed layer being an elastomeric adhesive material;

first contacting said stock with a first surface dimensioned and configured to engage a portion of said stock at a location spaced from said edge said location being sufficiently removed from said edge to allow said edge to be beveled;

applying a force to said first surface to generate a pressure on said stock, with said pressure being sufficient to substantially restrain said elastomeric material against movement; and then contacting said stock with a second surface at said edge location of said article and exerting a pressure on said edge sufficient to form said bevel, wherein said first and second surfaces are movable relative to one another, and wherein said article is a wound dressing.

10. A method of manufacturing an article comprising a plurality of layers including an adhesive layer having at least one beveled edge comprising the steps of supporting on a platform a length of feed stock having a plurality of layers, with one or more outer layers being flexible and with at least one internally disposed layer being an elastomeric adhesive material;

first contacting said stock with a first surface dimensioned and configured to engage a portion of said stock at a location spaced from said edge said location being sufficiently removed from said edge to allow said edge to be beveled; applying a force to said first surface to generate a pressure on said stock, with said pressure being sufficient to substantially restrain said elastomeric material against movement; and then contacting said stock with a second surface at said edge location of said article and exerting a pressure on said edge sufficient to form said bevel, wherein said first and second surfaces are movable relative to one another, and wherein said article is an ostomy connector for attachment to human skin.

* * * * *